June 21, 1949.                      C. RÜCHTI                       2,473,909
                    DUCT ELEMENT, INTENDED IN PARTICULAR
                          FOR LAYING ELECTRIC CABLES
Filed April 16, 1947                                        3 Sheets-Sheet 1

INVENTOR
CHARLES RÜCHTI
BY
Robert E. Burns
ATTORNEY

INVENTOR
CHARLES RÜCHTI
BY
Robert E Burns
ATTORNEY.

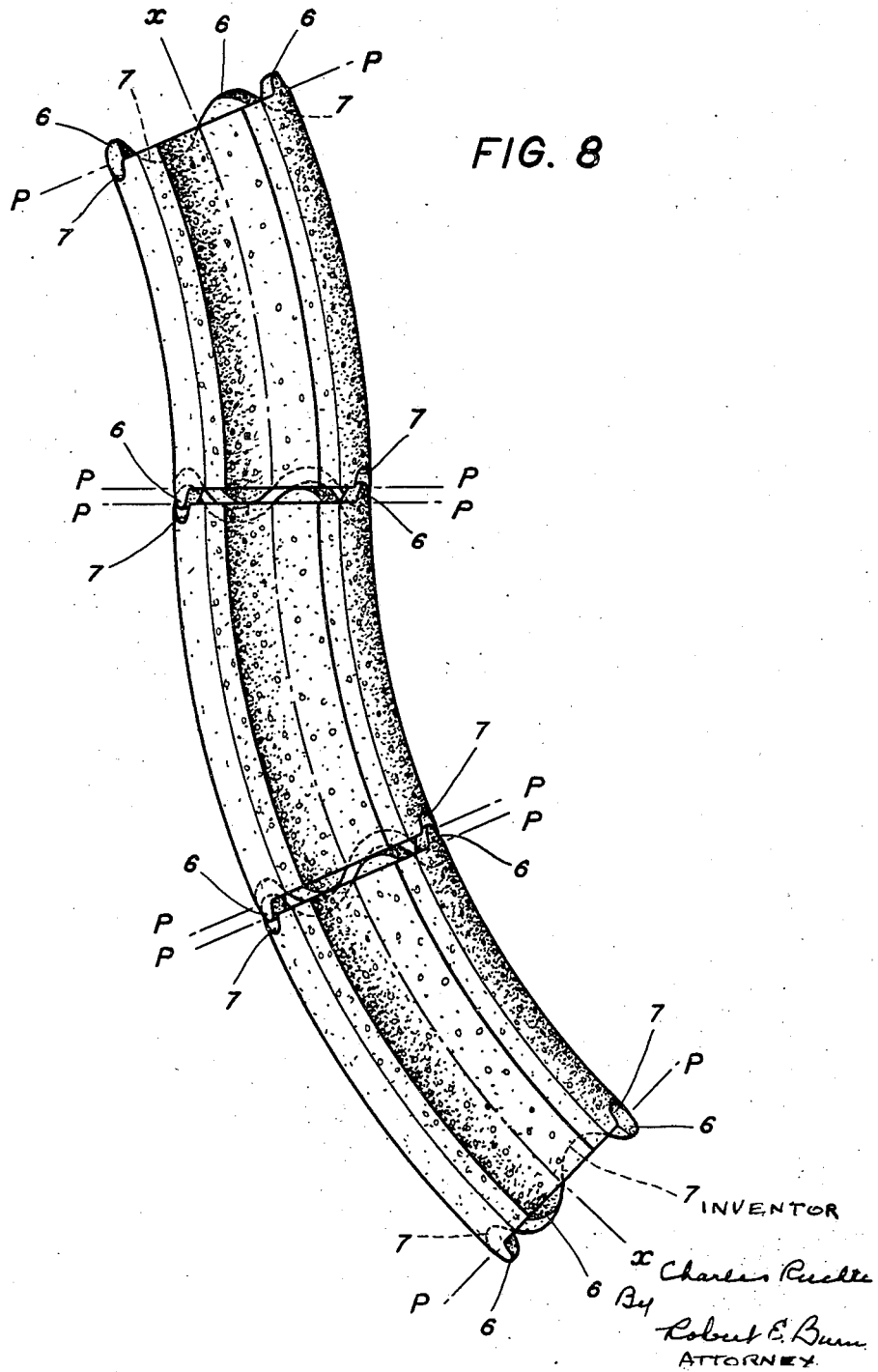

Patented June 21, 1949

2,473,909

UNITED STATES PATENT OFFICE 2,473,909

DUCT ELEMENT, INTENDED IN PARTICULAR FOR LAYING ELECTRIC CABLES

Charles Ruchti, Lausanne, Switzerland, assignor of one-third to Henri Besson and one-third to Charles Payot, both of Lausanne, Switzerland Application April 16, 1947, Serial No. 741,913
In Switzerland June 30, 1939

Section 1, Public Law 690, August 8, 1946
Patent expires June 30, 1959

2 Claims. (Cl. 138—81)

The present invention refers to a duct element intended in particular for laying electric cables.

It is characterized in that the end of the element is indented along a sinuous line developing on both sides of a plane at right angle with the longitudinal axis of the element, so as to present lugs and recesses apt to engage the corresponding recesses and lugs of an abutting element, whereby all transversal relative displacement between said elements is avoided.

The attached drawing shows by way of example three embodiments of the invention.

Figs. 1 to 5 refer to the first embodiment.

Figure 1:
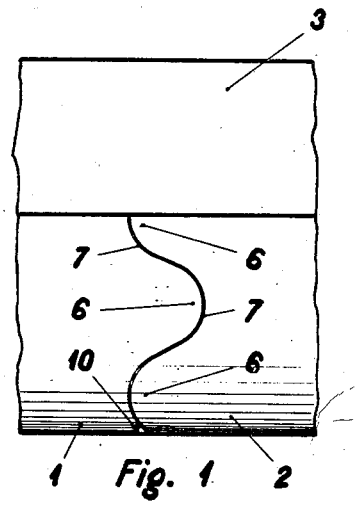
Fig. 1 is a side-view, Fig. 2 a plan view, Fig. 3 a longitudinal section along III—III of Fig. 2, and Fig. 4 a view from below, showing the ends of two abutting elements.
Figure 2:
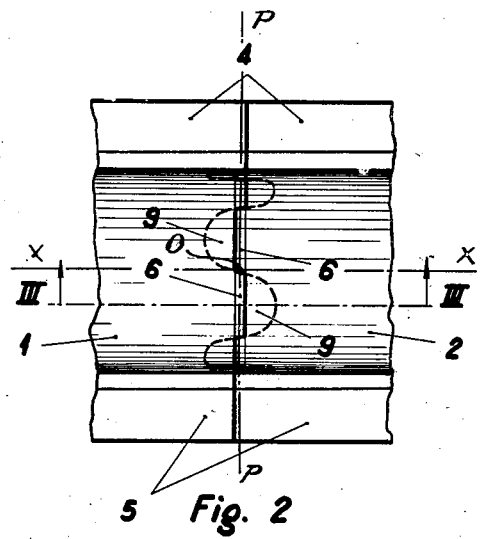
Figure 3:
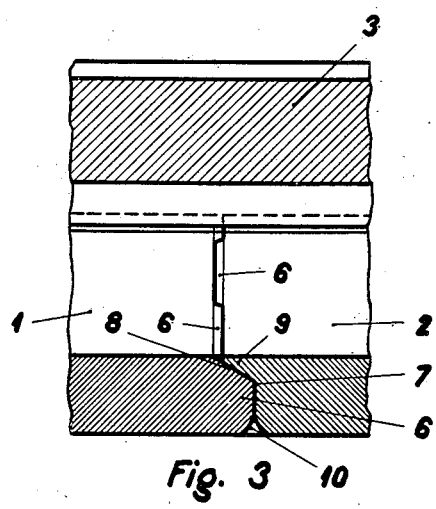
Figure 4:
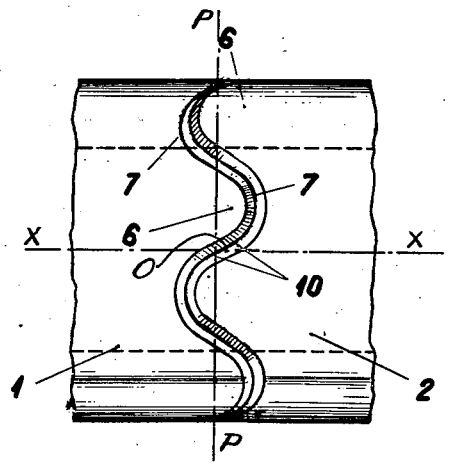
Figure 5:
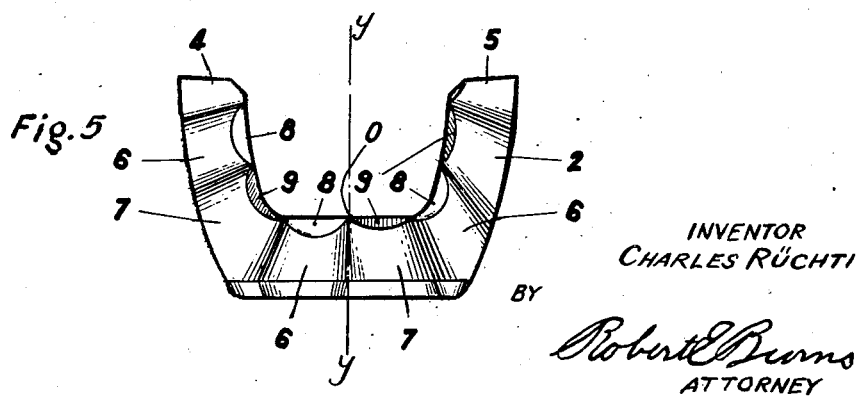
Fig. 5 is an end view.
Figure 6:
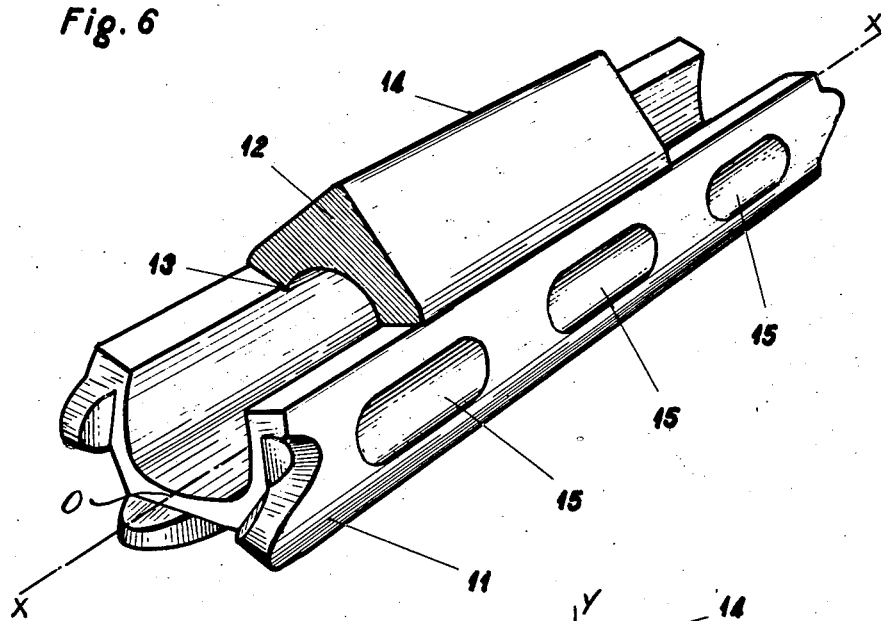
Figure 7:
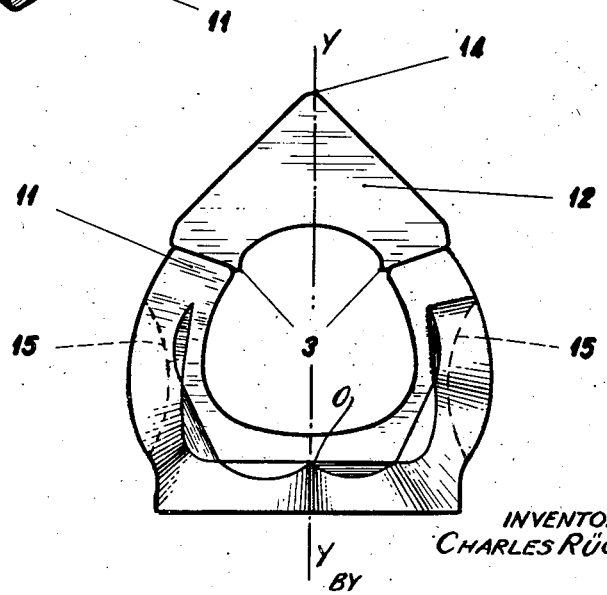

Figs. 6 and 7 refer to the second embodiment.

Fig. 6 is a perspective view thereof with its cover partly in cross-section.

Fig. 7 is an end view.

Fig. 8 is a top plan view showing three identical curved elements abutting end to end.

In the first embodiment shown, the drawing represents the ends of two elements 1 and 2 of a duct for electric cables, the two elements being intended to fit into one another by their abutting ends. Each element presents a cross-section of a trapezoidal shape, the wide basis of the trapeze being oriented upwards and being open. The element is closed at the top by a cover 3 bearing on the upper faces 4 and 5 of the side-walls of the element, these walls being slightly converging towards the bottom.

Both ends of the elements are indented along a sinuous line developing on both sides of a plane P—P at right angle with their longitudinal axis X—X, and thus present lugs and recesses apt to engage the corresponding recesses and lugs of the abutting element. These lugs and recesses 6 and 7 are formed in the whole thickness of the wall of the element. Both ends are identical and all elements are identical among themselves. The axis of symmetry Y—Y of the element intersects the sinuous line at a point of inflexion O thereof.

The lugs 6 present a bevel 8 towards the inside of the duct, in order to fit an inner projection 9 which partially closes the recesses 7 inside the duct, and the lower edge of lugs 6 and recesses 7 present also a bevel 10.

When the elements are in line, they cannot have any transversal relative motion, neither horizontally nor vertically. The sinuous shape of the lugs and recesses enables them however to be alined at a slight angle to one another so as to permit following long radius curves with straight elements.

The cover fits automatically on the element on account of the inclined upper faces 4 and 5, and ensures an efficient protection of the cable.

Owing to the fact that the axis of symmetry Y—Y of the element intersects the sinuous line at a point of inflexion O thereof, each identical curved element can be indifferently used both for left and right turnings as shown in Fig. 8, the two ends of this curved element being identical as are those of the straight elements.

These elements can be made in concrete, cement, brick or metal or in any other suitable moulding material.

In the second embodiment shown, the sidewalls are inclined towards one another at the top. The cover is V-shaped and presents an inner flange 13 ensuring a perfect centering. The cover presents an upper ridge 14 intended to protect the duct against accidental pick strokes. Both ends of the cover are straight.

On its convex sides, the element presents recesses 15 intended to reduce its weight.

The ends of the element present lugs and recesses of rounded shape apt to fit into one another and to prevent transversal relative displacement, although it allows of a slight angle between consecutive elements. For sharp turnings one uses a curved element presenting an angle of 22° 30', for example, between its transversal end-planes P—P. Its ends are identical to those of the straight elements and it can be used both for left and right turnings.

The half-closed U-shape of these elements has the advantage that it retains the cable in the ducts in the curves, the cable being applied against the side-wall towards the inside of the curve of the trench.

The side wall outer recesses 15 have also the advantage of improving the cooling qualities of the duct, whereby the load of the electric cable can be accordingly increased.

What I claim is:

1. A duct element intended in particular for laying electric cables, presenting a generally U-shaped cross-section and having on each end alternate indentations and projections forming a continuous sinuous line, the line of symmetry of which lies in a plane perpendicular to the longitudinal center line of the element, a projection and a recess at each end of the element lying on opposite sides of the axis of symmetry of the cross-section of the element in said plane with said axis passing through the point of reversal of curvature of said sinuous line, the two ends of said element being identical as viewed from the respective ends, whereby either end of an element is adapted to interfit with either end of another like element.

2. A duct element intended in particular for laying electric cables, presenting a generally U-shaped cross-section and having on each end alternate indentations and projections forming a continuous sinuous line, the line of symmetry of which lies in a plane perpendicular to the longitudinal center line of the element, a projection and a recess at each end of the element lying on opposite sides of the axis of symmetry of the cross-section of the element in said plane with said axis passing through the point of reversal of curvature of said sinuous line, the two ends of said element being identical as viewed from the respective ends, whereby either end of an element is adapted to interfit with either end of another like element, the inner edge portion of each end lying in a plane perpendicular to the longitudinal center line of the element and passing through the line of symmetry of the sinuous edge portion.

CHARLES RUCHTI.

REFERENCES CITED

The following references are of record in the file of this patent:

UNITED STATES PATENTS

| Number | Name | Date |
|---|---|---|
| 233,483 | Dietz | Oct. 19, 1880 |
| 1,823,819 | Crampton | Sept. 15, 1931 |

FOREIGN PATENTS

| Number | Country | Date |
|---|---|---|
| 679,253 | France | 1930 |
| 405 | Switzerland | 1889 |
| 20,386 | Norway | 1910 |